United States Patent
Mayfield et al.

(10) Patent No.: US 7,636,938 B2
(45) Date of Patent: *Dec. 22, 2009

(54) CONTROLLING NETWORK ACCESS

(75) Inventors: Paul Mayfield, Sammamish, WA (US); Bernard Aboba, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 631 days.

This patent is subject to a terminal disclaimer.

(21) Appl. No.: 11/170,977

(22) Filed: Jun. 30, 2005

(65) Prior Publication Data

US 2007/0006288 A1    Jan. 4, 2007

(51) Int. Cl.
*H04L 29/06*    (2006.01)

(52) U.S. Cl. .......................................... 726/5; 709/223

(58) Field of Classification Search ...................... None
See application file for complete search history.

(56) References Cited

U.S. PATENT DOCUMENTS

| 2002/0075844 A1* | 6/2002 | Hagen ........................ 370/351 |
| 2005/0131997 A1* | 6/2005 | Lewis et al. ................. 709/203 |
| 2006/0028996 A1* | 2/2006 | Huegen et al. ............... 370/252 |

* cited by examiner

*Primary Examiner*—Brandon S Hoffman
(74) *Attorney, Agent, or Firm*—Wolf, Greenfield & Sacks, P.C.

(57) ABSTRACT

One embodiment of the invention is directed to managing access of a host computer to a network. A first communication session with the host computer may be conducted to authenticate the host computer's identity. A second communication session with the host computer may be conducted to determine the health status of the host computer.

18 Claims, 5 Drawing Sheets

CONTROLLING NETWORK ACCESS

FIELD OF THE INVENTION

The present invention relates to managing access to a network.

DESCRIPTION OF THE RELATED ART

A computer network generally includes two or more computers, a medium for communication between the computers in the network (e.g., networking cables or, in the case of wireless networks, air), and one or more network devices that route data between the computers in the network. Such network devices may include, for example, routers, switches, and/or hubs. The network devices may receive data from one computer or network device in the network and forward that data to one or more other computers or network devices in the network.

Often it is desired to control access to the network to prevent unauthorized users from gaining access to network resources (e.g., printers, computers, storage devices, etc.). This may be accomplished, for example, by configuring the network devices to refrain from forwarding data received from unauthorized users to other computers and/or network devices and to refrain from sending data to unauthorized users.

However, conventional authentication may not be sufficient to prevent malicious users from accessing the network. While a user may be authenticated and authorized to use the network, the user's computer may have a virus or a security hole that allows a malicious user to exploit the computer and cause it to perform some undesirable actions.

SUMMARY OF THE INVENTION

Applicants have appreciated that conventional authentication techniques may not be sufficient, as they do not verify the health of computers that are permitted to access the network. Thus, applicants have developed a technique whereby a first communication session to authenticate the computer's identity may be conducted and a second separate communication session to authenticate the computer's health may also be conducted. When the computer's health is authenticated, the computer may receive a health credential that indicates that the computer's health has been authenticated. The health credential may be re-used in subsequent network access sessions so that the computer's health need not be authenticated each time the computer attempts to gain network access.

Accordingly, one embodiment is directed to a method of managing network access of a computer comprising acts of: conducting a first communication session to determine an identity of the computer; and conducting a second communication session to determine a health status of the computer. Another embodiment is directed to at least one computer readable medium encoded with instructions that, when executed on a computer system, perform the above-described method.

A further embodiment is directed to a computer system for managing access to a network, comprising: a network interface for sending and receiving data; and at least one controller, coupled to the network interface, that: conducts a first communication session, through the network interface, to determine an identity of the computer; and conducts a second communication session, through the network interface, to determine a health status of the computer.

Another embodiment is directed to a method of controlling access to a network by a computer comprising acts of: receiving, at a network access device, identity information about the computer at a network access device; receiving, at the network access device, a health credential from the computer that indicates a security state of the computer; and determining whether to grant network access to the computer based on the identity information and the health credential. A further embodiment is directed to at least one computer readable medium encoded with instructions that, when executed, perform the above-described method.

Another embodiment is directed to a method of obtaining network access comprising acts of: sending, from a computer, a network access request to a network access device, wherein the network access request includes identity information; receiving, at the computer, in response to the network access request, limited network access, wherein the limited network access permits access to a health credential server; conducting a communication session between the computer and the health credential server to determine a security state of the computer; and when it is determined that the computer is in a required security state, receiving a health credential from the health credential server. A further embodiment is directed to at least one computer readable medium encoded with instructions that, when executed, perform the above-described method.

DETAILED DESCRIPTION

Applicants have appreciated that conventional authentication may not be sufficient to protect a network from malicious users as the machines of authorized users may have viruses or security holes of which the users are unaware. Thus, in one embodiment of the invention, in addition to requiring authentication, a user may be required to demonstrate that the computer of the user is in a specified security state. The process of determining if a computer is in the specified security state is hereinafter referred to as health checking or performing a health check. Health checking may be accomplished in any suitable way and the invention is not limited in this respect.

In one embodiment of the invention, the authentication and the health check may be performed separately. In this respect, while a user or computer may be authenticated each time the computer connects to the network, the health check need not be performed every time. Rather, once the health check is performed, the user or computer may be issued a health credential that signifies that the computer is in a required security state. For example, The health credential may be issued with a limited validity period that is selected to provide a desired level of ongoing compliance to a security policy. Rather than perform the health check each time, the user or computer may present the previously issued health credential without undergoing a health check. Once the validity period for the health credential has expired, the computer may undergo another health check and obtain a new health credential.

Communication across a network requires a variety of different functions to be performed. It often does not make sense for a single application program that is used in network communications to handle all of these functions. For example, it would be cumbersome if an application program that sends and receives e-mail had to be aware of the physical and electrical characteristics of the underlying network cabling over which the e-mail is transferred. Thus, the functions that are performed in network communication are often though of conceptually as a set of layers, where each layer represents a set of particular network functions that are reasonably self-contained so that the functions in each layer can be implemented independent from the functions of other layers. Thus, in the example above, the e-mail application program need not be aware of whether the underlying network is an Ethernet network or a Token Ring network, as the e-mail application may simply pass the data to be transferred over the network to a lower layer, which handles such details.

Figure 1:
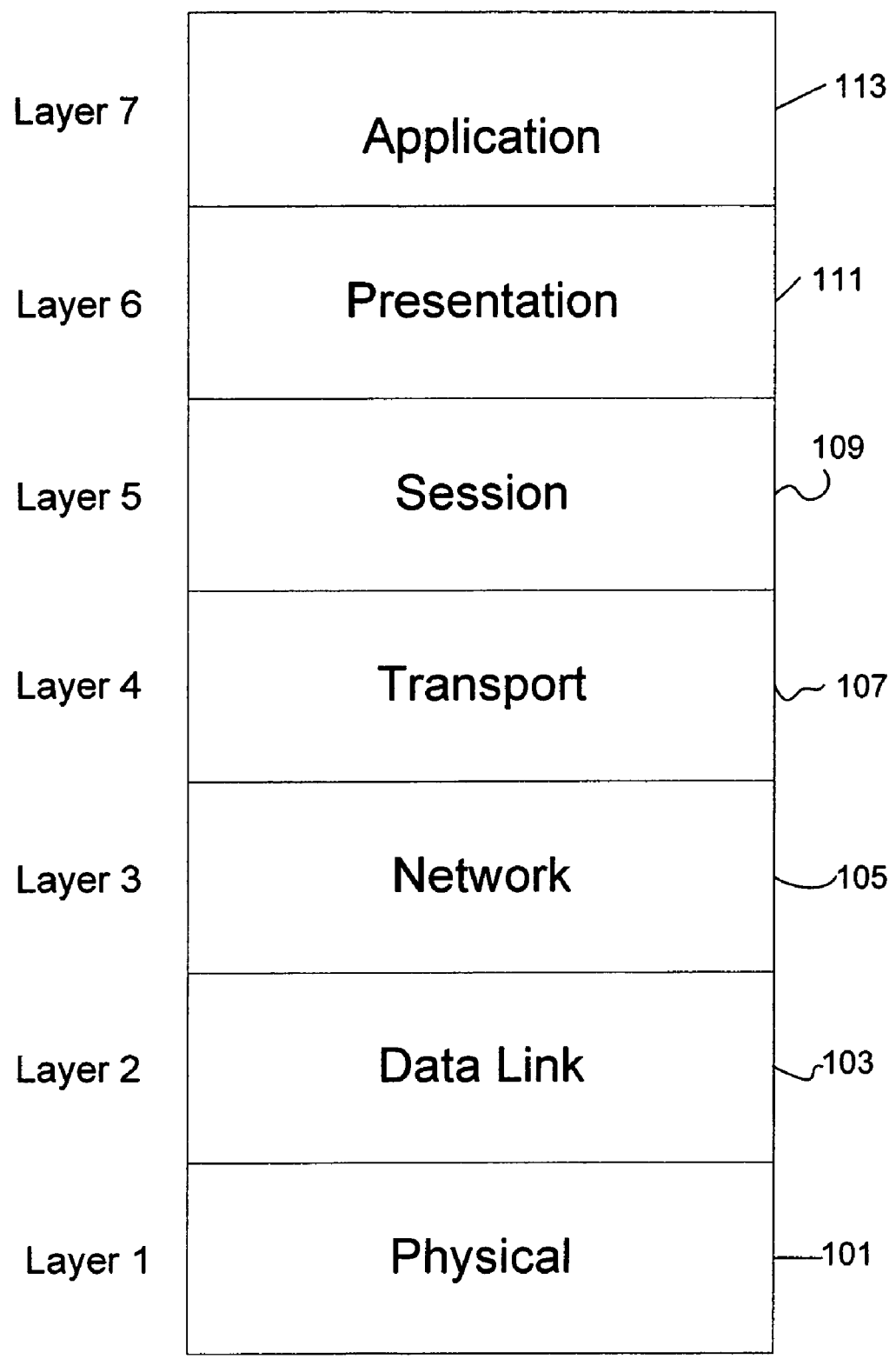
FIG. 1 is a diagram of the Open System Interconnection reference model.

One popular model of network layers is the Open System Interconnection (OSI) reference model, shown in FIG. 1. The OSI model includes seven layers, each specifying particular network functions. In practice, computers communicate over a network using communication protocols, which are sets of conventions that govern how computers exchange information over a network medium. A protocol implements the functions of one or more of the layers. Layer 1 of the OSI model is physical layer 101. The physical layer is concerned with transmitting raw bits over a communication medium (e.g., a network cable). Thus, issues at the physical layer are, for example, the voltage used to represent a '1' and the voltage used to represent a '0', the signal timing (e.g., how many microseconds each bit lasts), length of cables, and other physical and electrical characteristics. Layer 2 of the model is data link layer 103. The data link layer is concerned with performing reliable transmission of data across a physical link. Functions performed at the data link layer include dividing input data into frames, transmitting the frames sequentially, and processing acknowledgements of receipt of the frames that are sent back by the receiver. Layer 3 of the model is network layer 105. At network layer 105, the routing of messages between computer in a network and between networks is performed. One example of a protocol that performs network layer functions is the Internet Protocol (IP).

Layer 4 of the model is transport layer 107, whose basic function is to assure that all packets arrive at the destination computer in the order that they were sent from the source computer. Layer 5 of the model is session layer 109. The session layer establishes, manages, and terminates communication sessions. Layer 6 of the model is the presentation layer 111. The presentation layer relates to encoding of binary data in a standard agreed upon way. Examples of protocols at this layer include hyper text transfer protocol (HTTP) and the post office protocol (POP). Layer 7 of the model is application layer 113. Application layer 113 allows users to interact with software that sends data over the network. Thus, for example an e-mail application program that knows how to respond when a user clicks the "send e-mail" button is an example of performing an application layer function.

Figure 2:
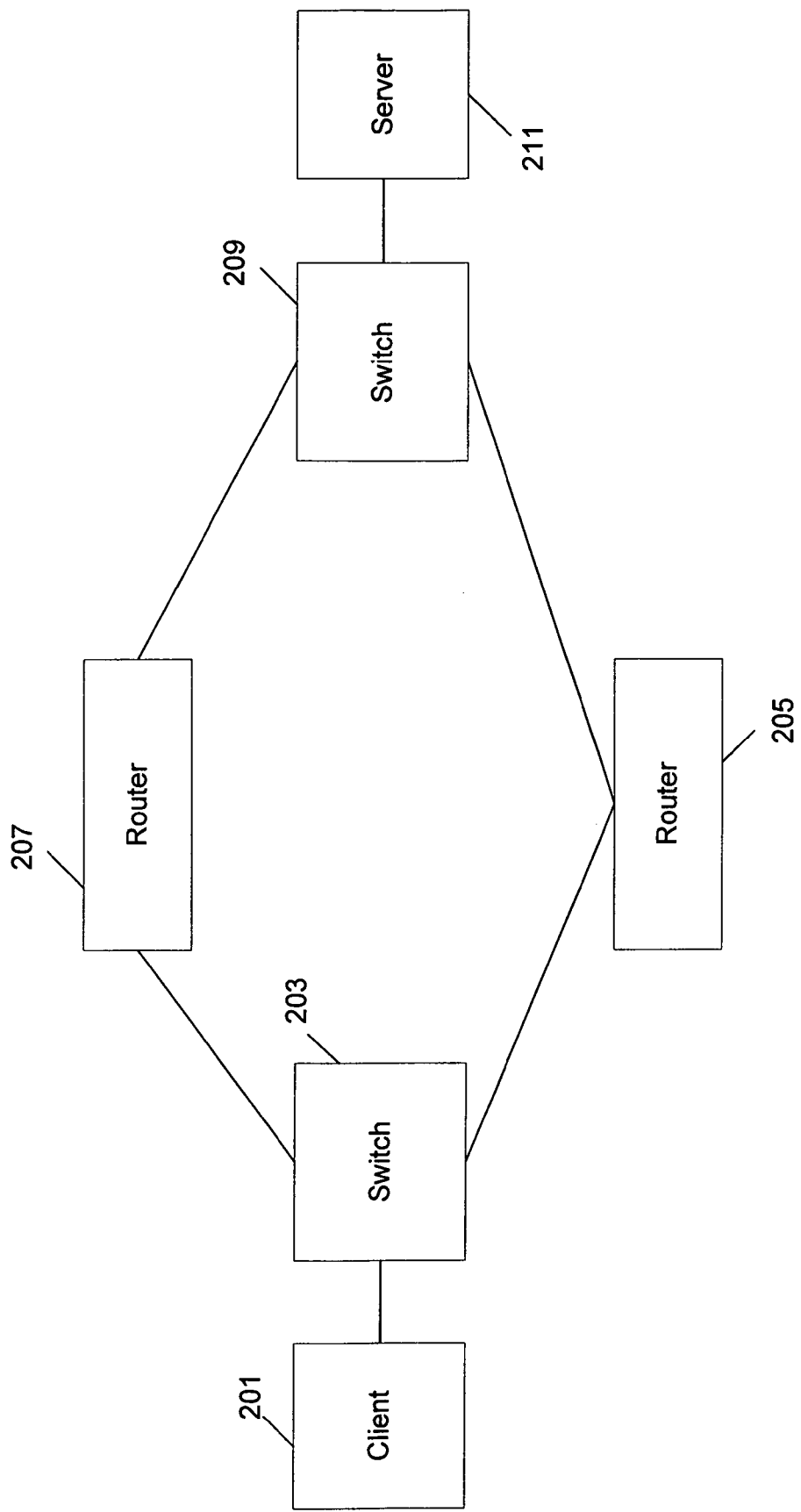
FIG. 2 is a diagram of a system in which upper layer flow control protocols may be employed.

It should be appreciated that layer 2 protocols perform flow control functions between devices that are directly connected. That is, for example, data link layer protocols may ensure that a data sent from the transmitter does not drown the receiver to which it is directly connected with too much data by allowing the receiver to let the transmitter know how much buffer space it has available. A different type of flow control takes place at higher layers in the model. That is, higher layer protocols allow flow control between devices that may be connected through multiple network devices. For example, as shown in FIG. 2, there are two paths over the network through which client 201 may transmit data to server 211. That is, when client 201 sends data to switch 203, switch 203 may forward this data to either router 207 or router 205. Each of these routers may in turn forward the data to switch 209, which then forwards the data to server 211. Thus, for example if client 201 sends a request for a web page to server 211, a first portion of the request may be sent through router 205, while a second portion is sent through router 207. Because one of these connection may be slower than the other, there is no guarantee that the first portion of the data will reach server 211 before the second portion of the data. Flow control protocols at layer 3 and layer 4 allow server 211 to reorder the messages received from client 201 so that they are processed in the right order. Further, these layer 3 and layer 4 protocols manage data buffers and coordinate traffic so that if client 201 is sending data too fast, it will be stopped so that server 211 can keep up.

Figure 3:
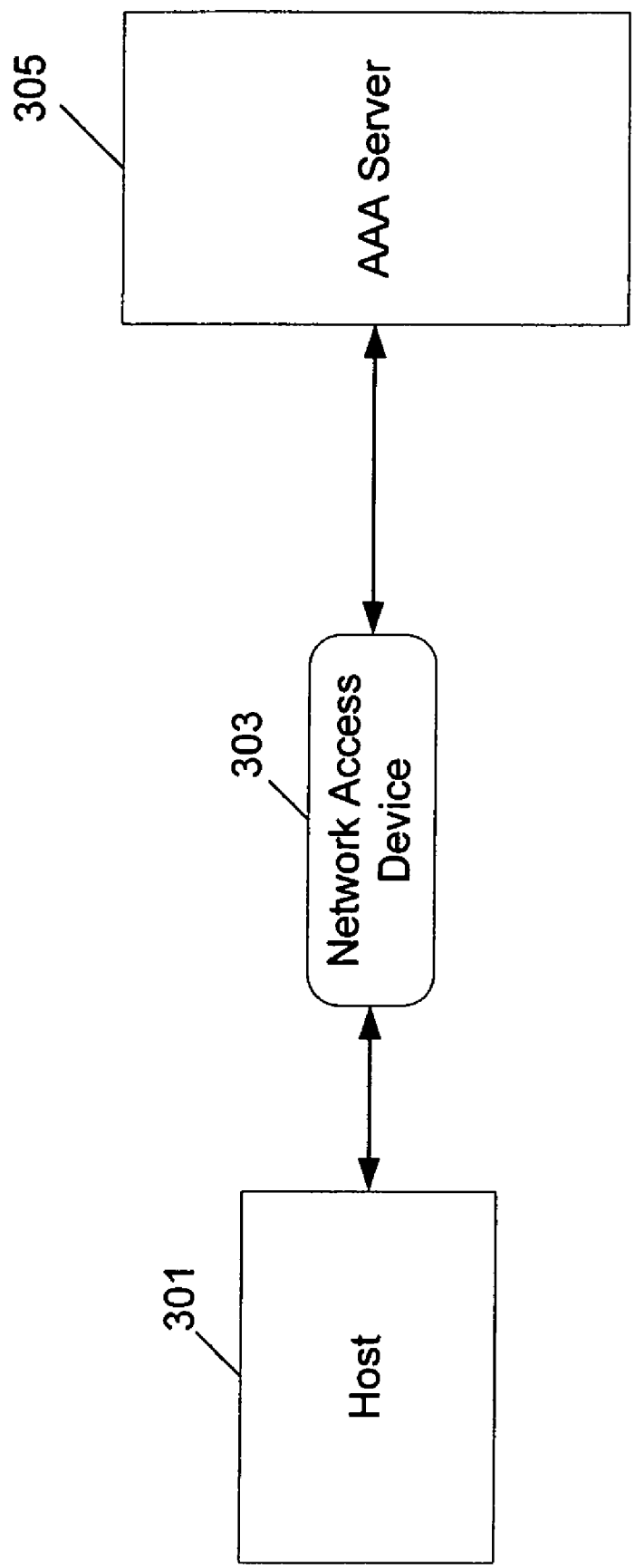
FIG. 3 is a diagram of system for authenticating entities prior to granting network access.

In one embodiment, authentication may take place as shown in FIG. 3. A host 301 may access a network through a network access device 303. However, network access device 303 may be configured to prevent host 301 from accessing the network until authentication, authorization, and accounting (AAA) server 305 has indicated to network access device 303 that host 301 is permitted to access the network. That is, network access device 303 may be initially provisioned with a filter that prevents network communications from host 301 from reaching the network. As used herein, the term filter refers to any type of filter, virtual local area network (VLAN), or any other suitable isolation method.

When host 301 boots up or attempts to access the network, it may send authentication messages to network access server 303 that provide information needed to authenticate the host 301 and/or its current user. Network access server may forward these authentication messages to AAA server 305 which may use the information included therein along with previously created access policies to determine if host 301 should be permitted to access the network and how much network access the host 301 should be given. If AAA server determines that host 301 should be permitted to access the network it may reconfigure the filter on network access device 303 so that host 301 is given the appropriate level of access.

In the example above, the network access device may be any suitable device as the invention is not limited in this respect. For example, network access device may be a network switch or may be a network access server. Further, AAA server may be any suitable computer that is capable of determining if a computer or device is permitted to access the network and configuring network access device to allow one or more levels of access for host computers that have been determined to have network access permissions. For example, AAA server may be a RADIUS server. Any suitable protocol or protocols may be used in sending authentication messages from host 301 to network access device 303 and from network access device 303 to AAA server 305, as the invention is not limited in this respect. For example, the extensible authentication protocol (EAP) or an 802.1x protocol may be used.

While the system for authentication shown in FIG. 3 may be useful for verifying the identity of a host computer, such authentication does nothing to verify the health of the host.

That is, for example, the host computer may be given unrestricted access to the network based on its identity and/or the identity of its user, but the host may be infected with a virus or other malicious code that floods the network with meaningless data, rendering the network useless.

Thus, in one embodiment, when host 301 desires to access the network, network access device 303 may authenticate host 301 using health information (e.g., in the form of a health credential) in addition to traditional identity-based authentication. Network access device 303 may pass this health information and authentication information to AAA server 305 which then determines what level of access should be granted (if any) based on the security state and the identify of the host. The AAA may then configure the network access server 303 to allow the desired level of access.

For example, host computer 301 may run software that collects information about the security state of the computer. The security state information may be collected in any suitable way, as the invention is not limited in this respect. For example, the software that collects information may retrieve information from the operating system to determine if the latest patch of the operating system is installed or may retrieve information from anti-virus software installed on the host to determine if the host has any viruses. Host 301 may send this information to network access device 301 by embedding this information in the authentication messages.

While this method allows the AAA server to verify the host's identity and perform a health check on the computer, it requires that health information be sent from host 301 to network access device 303 each time the host 301 authenticates to the AAA server. This requires additional processing on both the host and AAA server, as the host must collect the security state information and the AAA server must verify that the host is in the required security state using the security state information for each authentication. Further, because the security information is embedded in the authentication messages, the amount of health information that may be provided is limited by the efficiency of the authentication protocol. That is, verifying that the host is in a required security state may involve validation from a plurality of sources (e.g., servers). Because the host has not yet been granted access to the network, the host cannot contact these sources and have them perform validation of health. Rather, the host must imbed health information in the authentication messages and send these messages to the network access device according to the authentication protocol (e.g., EAP or 802.1x). Typically, network access authentication protocols are layer 2 protocols and are thus limited in their efficiency by the lack of layer 3 (e.g., IP) services. Thus, embedding the health information in authentication messages may be inefficient.

Figure 4:
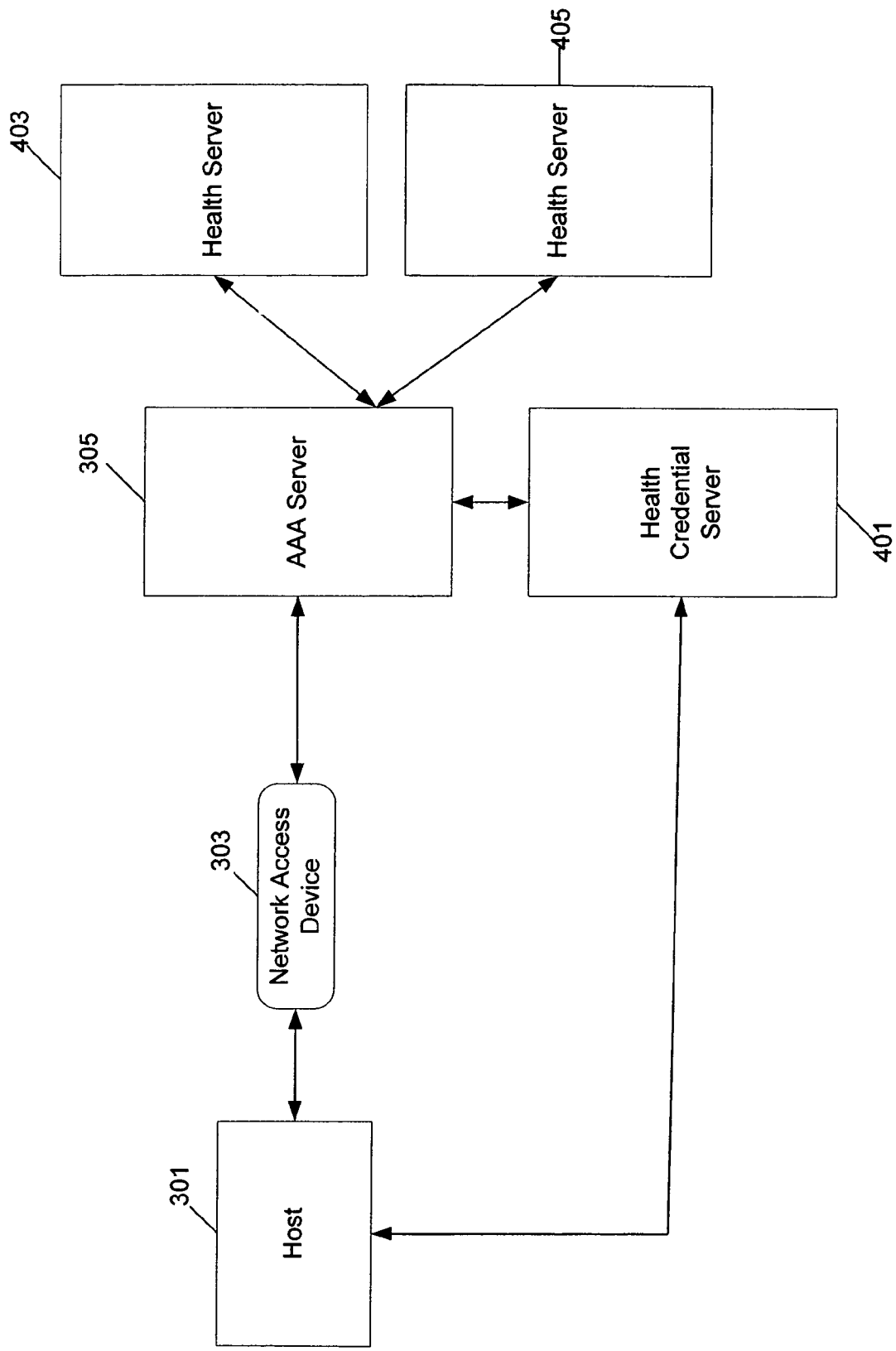
FIG. 4 is a diagram of an example of a system for authenticating entities and performing health checks on entities, in accordance with one embodiment.

To address this, in one embodiment of the invention, a host computer may gain access to the network by having two separate validation sessions: one for authentication and one for health checking. This may be done in any suitable way, as the invention is not limited in this respect. For example, as shown in FIG. 4, when host 301 desires to access the network, host 301 authenticates to a network access device 303. Network access device 303 provides the authentication information received from host 301 to AAA server 305. AAA server 305 first authenticates the identity of host 301 and, if host 301 is authenticated, AAA server 305 configures network access device 303 to give limited network access to host 301. That is, host 301 may be permitted to contact health credential server 401, but may not be permitted to otherwise access the network. This may be accomplished in any suitable way, as the invention is not limited in this respect. For example, network access device 303 may be provisioned with a filter that permits host 301 to access health credential server 401 but does not allow any other network communications from host 301.

Host 301 may then contact health credential server 401 and carry out a session in which health credential server 401 may perform a health check on host 301. This may be done in any suitable way, as the invention is not limited in this respect. For example, health credential server 401 may consult with AAA server 305 to determine whether to issue a health credential. AAA server 305 may contact additional health servers (e.g., health servers 403 and 405) in determining whether host 301 is in the required security state. For example, health credential server may forward anti-virus information received from host 301 to AAA server 305 to determine if host 301 is virus free. AAA server 305 may, in turn, forward the anti-virus information to an anti-virus server (e.g., health server 403), which determines if the anti-virus information indicates that the host is virus free and return the result to AAA server 305. Based on the result of the health check, AAA server 305 may inform health credential server 401 whether a health credential may be issued to host 301. If host 301 is in the required security state and is thus issued a health credential, host 301 may re-authenticate to network access device 303 using the health credential.

In one embodiment, the health credential may be re-used by host 301 so that a health check need not be performed each time host 301 desires to authenticate to the network. This may be done in any suitable way, as the invention is not limited in this respect. For example, when host 301 desires to access the network, as in the example above, it may begin an authentication session with network access device 303. In addition to the typical authentication information, host 301 may also prove possession of the health credential in the authentication messages. The authentication information and health credential may be forwarded to AAA server 305. AAA server 305 may determine if the health credential is valid and, if so, may remove the network access restrictions on host 301. Thus, it may not be necessary to have a separate communication session between health credential server 401 and host 301 to perform a health check, as the health credential received by host 301 in response to a previous health check may be used by host 301 to prove that it is in the required security state.

In the example of FIG. 4, host 301 is shown directly communicating with health credential server 401. It should be appreciated that this direct communication is shown for the sake of conceptual clarity and that in practice, host computer may communicate with health credential server 401 through one or more network devices, including, but not limited to, network access device 305.

As described above in connection with FIG. 4, host 301 may conduct two separate communications sessions to gain access to the network: an authentication session and a health check session. Any suitable authentication protocol may be used in conducting the authentication session, as the invention is not limited in this respect. In one embodiment, an authentication protocol may be used that does not provide flow control between devices that are not directly connected (e.g., a layer two protocol) For example, the extensible authentication protocol (EAP) may be used or an 802.1x protocol may be used.

Further, any suitable protocol may be used to carry out the health check communication session. For example, in one embodiment, a protocol or protocol(s) that provides flow control between devices that are not directly connected may be used.

Figure 5A:
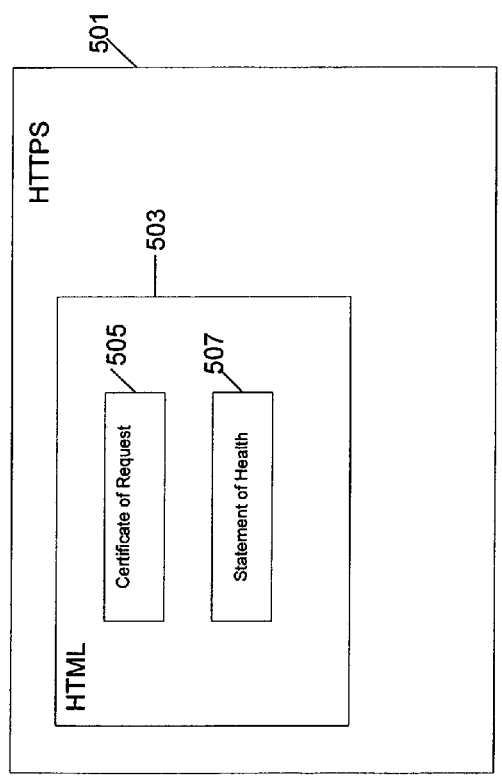
FIG. 5A is a diagram of an example of a message that may be used to request a health credential.
Figure 5B:
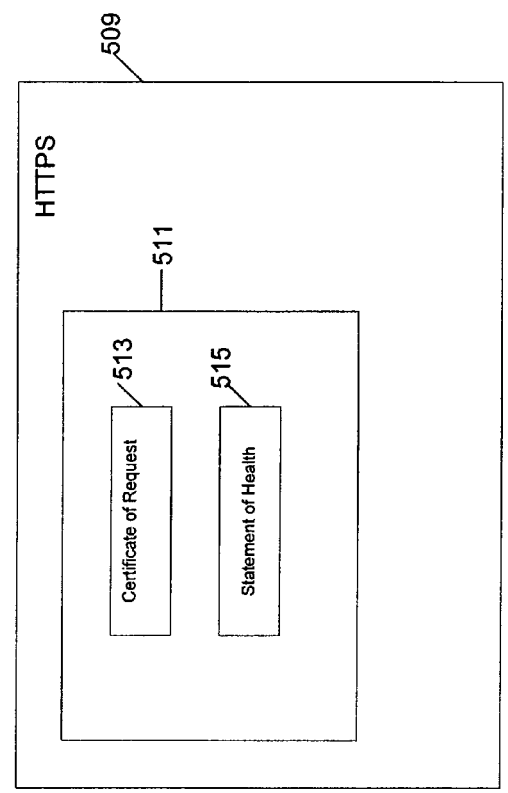
FIG. 5B is a diagram of an example of a message that may be used to reply to a request for a health credential.

In one embodiment, the hyptertext transfer protocol over secure socket layer (https) may be used in performing the health check. For example, as shown in FIG. 5A, one or more https packets 501 may be sent that include an hypertext markup language (HTML) document 503. The HTML document 503 includes a certificate request 505 and a statement of health 507. Health credential server 401 may use the statement of health 507 to determine if the host 301 is in the required security state. Health credential server 401 may respond as shown in FIG. 5B. That is, health credential server may send one or more https packets 509 that include an HTML document 511. The HTML document includes a response to the certificate request 513 and a response to the statement of health 515. For example, if health credential server 401 determines that host 301 is in the required security state, the response to the certificate request 513 may include a certificate that can be used as a health credential by host 301. Further, the response to the statement of health may indicate that host 301 has passed the required health checks. Similarly, if health credential server 401 determines that host 301 is not in the required security state, response to certificate request 513 may indicate that the certificate request has been denied and response to statement of health 515 may specify which of the required health checks host 301 did not pass.

It should be appreciated that in FIG. 5A and FIG. 5B a single box was used to represent the https packets that carry an HTML document. However, it should be appreciated that these HTML documents may be carried in multiple https packets (i.e., with a portion of the HTML document being transmitted in each packet), as the invention is not limited in this respect.

In one embodiment, in addition to performing a health check on host 301, health credential server 401 may also authenticate host 301. By authenticating host 301, health credential server 401 can check that it is not issuing a health credential to the wrong host computer. Host 301 may be authenticated by health credential server in any suitable way, as the invention is not limited in this respect. For example, in embodiments that employ the https protocol for carrying out health checks, host 301 may be authenticated using HTTP-Auth protocol or the client side TLS protocol.

In the example of FIG. 4, network access device 303 communicates with AAA server 305 to send messages from host 301 to AAA server 305 and to allow AAA server 305 to configure the filters on network access device 303. Any suitable protocol may be used for these communications as the invention is not limited in this respect. For example, in one embodiment AAA server 305 may be a RADIUS server that communicates with network access device 303 using the RADIUS protocol.

In the examples discussed above, a certificate is used as a health credential. Any suitable credential may be used, as the invention is not limited in this respect. For example, a PKCS10 digital certificate may be used or a PKCS7 digital certificate may be used. Further, it should be appreciated that the health credential need not be a certificate, as any other suitable type of health credential may be used and the invention is not limited in this respect. For example, a Kerberos ticket, a security assertion markup language (SAML) token, or any other suitable type of authentication token may be used.

It should be appreciated that any suitable information may be included in the statement of health for host 301, as the invention is not limited in this respect. The information may include, for example, whether software is installed, patch state of installed software, installed software version, the state of the firewall, registry keys and values, file system objects, file shares, services, anti-virus tools, and anti-virus signatures and states.

In FIG. 4, AAA server 305 and health credential server 401 are depicted as different computers. However, it should be appreciated that the invention is not limited in this respect, as a single server may perform the functions of both AAA server 305 and health credential server 401. Although a single server performs the functions of both authentication functions and health check functions, host 301 may nevertheless have two separate communication sessions with the server. Thus, a first communication session may be conducted to authenticate the host, for example, using a layer 2 authentication protocol. and second communication session may be conducted to perform a health check, for example, using upper layer protocols.

A valid health credential issued to host 301 by health credential server 401 may be issued for a limited period of time. Thus, after the time period ends the health credential may expire and become invalid. For example, if a new operating system patch is released, a health credential that was issued prior to the release of the patch may be considered invalid. Thus, when host 301 presents such a health credential when requesting to gain access to the network, AAA server 305 may determine that the health credential is no longer valid. Thus, rather than granting host 301 unfettered access to the network, AAA server 305 to grant host 301 limited access to the network, so that a new health check may be performed between host 301 and health certificate server 401.

Host 301 may execute applications that access various servers for operation. For example, host 301 may execute an e-mail application that accesses an e-mail server to download received messages and/or an instant messaging program that establishes a connection with one or more central instant messaging servers. Applicants have appreciated that when the host 301 is granted limited access to the network to conduct a health check communication session with health credential server 101, such applications may malfunction. For example, these applications may send network communications attempting to contact various servers, but these communications may be denied, as host 301 has not yet been granted full access to the network. As a result, these applications may hang.

Thus, in one embodiment, to address this, the propagation of network availability information used by these applications to send communications on the network may be delayed until the health validation exchange has been successfully concluded. This may be done in any suitable way, as the invention is not limited in this respect.

In one embodiment, the operating system of host 301 may collect and store information about the network configuration and what networks are currently available. Application programs may access this information via an application programming interface (API) provided by the operating system. The operating system may be configured to not provide network configuration information through the API until after the health check is successfully completed. As a result, the application programs will not attempt to access the network until the host 301 has gained network access.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of controlling access to a network by a computer in a computer system comprising the computer, a network access device, an authentication server, and a health credential server, the method comprising acts of:
    receiving, at the network access device, identity information about the computer at a network access device;
    in response to receiving the identity information about the computer, conducting a first communication session with the authentication server to verify the identity of the computer;
    when the identity of the computer is verified, configuring the network access device to allow the computer to communicate over the network with the health credential server;
    receiving, at the network access device, a health credential from the computer that indicates a security state of the computer; and
    determining whether to grant network access to the computer based on the identity information and the health credential.

2. The method of claim 1, wherein the health credential is a certificate.

3. The method of claim 1, further comprising acts of:
    determining whether the identity information is valid; and
    determining whether the health credential is valid.

4. The method of claim 3, wherein the act of determining whether the health credential is valid further comprises:
    determining whether the health credential is expired.

5. At least one computer-readable medium encoded with instructions that, when executed, perform a method of controlling access to a network by a computer in a computer system comprising the computer, a network access device, an authentication server, and a health credential server, the method comprising acts of:
    receiving, at the network access device, identity information about the computer at a network access device;
    in response to receiving the identity information about the computer, conducting a first communication session with the authentication server to verify the identity of the computer;
    when the identity of the computer is verified, configuring the network access device to allow the computer to communicate over the network with the health credential server;
    receiving, at the network access device, a health credential from the computer that indicates a security state of the computer; and
    determining whether to grant network access to the computer based on the identity information and the health credential.

6. The at least one computer-readable medium of claim 5, wherein the health credential is a certificate.

7. The at least one computer-readable medium of claim 5, wherein the method further comprises acts of:
    determining whether the identity information is valid; and
    determining whether the health credential is valid.

8. The at least one computer-readable medium of claim 7, wherein the act of determining whether the health credential is valid further comprises:
    determining whether the health credential is expired.

9. A method of obtaining network access comprising acts of:
    sending, from a computer, a network access request to a network access device, wherein the network access request includes identity information;
    receiving, at the computer, in response to the network access request, limited network access, wherein the limited network access permits access to a health credential server;
    conducting a communication session between the computer and the health credential server to determine a security state of the computer; and
    when it is determined that the computer is in a required security state, receiving a health credential from the health credential server.

10. The method of claim 9, further comprising acts of:
    sending, from the computer, a network access request to the network access device, wherein The network access request includes the identity information and the health credential; and
    receiving, in response to the request, additional network access.

11. The method of claim 9, wherein the act of conducting the communication session between the computer and the health credential server further comprises acts of:
    sending health information about the computer from the computer to the health credential server;
    verifying that the health information complies with a predefined security policy.

12. The method of claim 9, wherein the limited network access includes limited layer 3 network access.

13. The method of claim 9, further comprising acts of:
subsequently re-authenticating the computer using the identify information and the health credential.

14. At least one computer readable medium encoded with instructions that, when executed, perform a method of obtaining network access comprising acts of:
sending, from a computer, a network access request to a network access device, wherein the network access request includes identity information;
receiving, at the computer, in response to the network access request, limited network access, wherein the limited network access permits access to a health credential server;
conducting a communication session between the computer and the health credential server to determine a security state of the computer; and
when it is determined tat the computer is in a required security state, receiving a health credential from the health credential server.

15. The at least one computer readable medium of claim 14, wherein the method further comprises acts of:
sending, from the computer, a network access request to the network access device, wherein the network access request includes the identity information and the health credential; and
receiving, in response to the request, additional network access.

16. The at least one computer readable medium of claim 14, wherein the act of conducting the communication session between the computer and the health credential server further comprises acts of:
sending health information about the computer from the computer to the health credential server;
verifying that the health information complies with a predefined security policy.

17. The at least one computer readable medium of claim 14, wherein the limited network access includes limited layer 3 network access.

18. The at least one computer readable medium of claim 14, wherein the method further comprises an act of:
subsequently providing the identify information and the health credential to the network access device to re-authenticate the computer.

* * * * *

UNITED STATES PATENT AND TRADEMARK OFFICE
CERTIFICATE OF CORRECTION

| | | |
|---|---|---|
| PATENT NO. | : 7,636,938 B2 | Page 1 of 1 |
| APPLICATION NO. | : 11/170977 | |
| DATED | : December 22, 2009 | |
| INVENTOR(S) | : Paul Mayfield et al. | |

It is certified that error appears in the above-identified patent and that said Letters Patent is hereby corrected as shown below:

In column 10, line 54, in Claim 10, delete "The" and insert -- the --, therefor.

In column 11, line 19, in Claim 14, delete "tat" and insert -- that --, therefor.

Signed and Sealed this
Tenth Day of May, 2011

David J. Kappos
*Director of the United States Patent and Trademark Office*